B. W. MEREDITH & O. WILDMAN.
TIRE.
APPLICATION FILED MAR. 12, 1909.
945,470.
Patented Jan. 4, 1910.
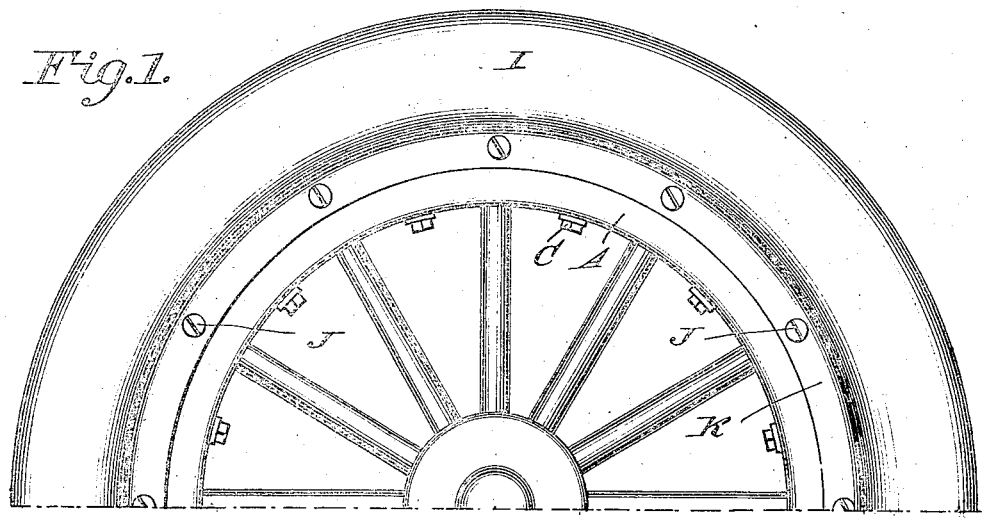
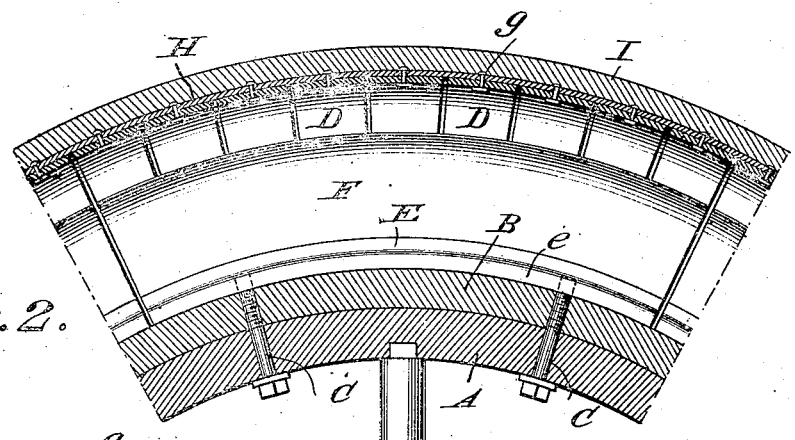
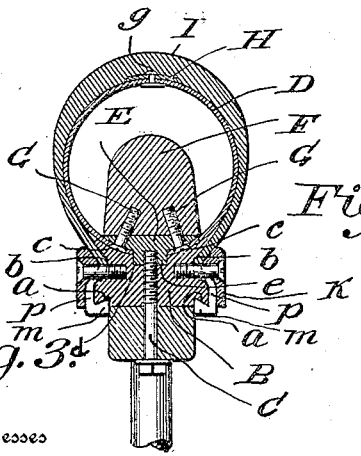
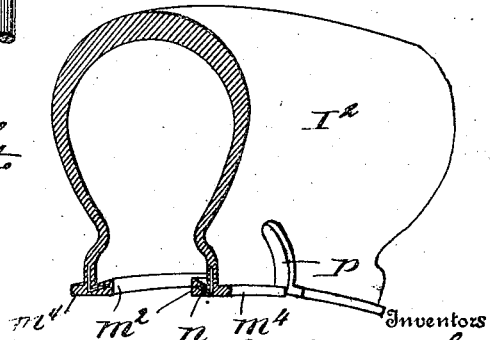
Witnesses
Phil E. Barnes
W. C. Healy
Inventors
B. W. Meredith
O. Wildman
By James Sheehy
Attorney

UNITED STATES PATENT OFFICE.

BYRON W. MEREDITH AND OSCAR WILDMAN, OF MORRISVILLE, PENNSYLVANIA.

TIRE.

945,470.

Specification of Letters Patent. Patented Jan. 4, 1910.

Application filed March 12, 1909. Serial No. 482,885.

*To all whom it may concern:*

Be it known that we, BYRON W. MEREDITH and OSCAR WILDMAN, citizens of the United States, residing at Morrisville, in the county of Bucks and State of Pennsylvania, have invented new and useful Improvements in Tires, of which the following is a specification.

Our invention pertains to tires for automobile and other wheels, and contemplates the provision of a light, puncture-proof, and highly resilient tire, and one that is capable of bearing great weight and withstanding severe shocks, and is so constructed that when its cover or shoe is worn, the same may be readily removed and as readily replaced with a new cover or shoe.

Other objects and advantageous features of the invention will be fully understood from the following description and claims when the same are read in connection with the drawings, accompanying and forming part of this specification, in which:

Figure 1 is a side elevation of half of a wheel equipped with the tire constituting the best practical embodiment of our invention of which we are cognizant. Fig. 2 is an enlarged, longitudinal-central section taken through a portion of the tire. Fig. 3 is a transverse section of the tire, and: Fig. 4 is a sectional perspective view of a slightly modified form of cover or shoe that may be used when deemed expedient.

Similar letters designate corresponding parts in all of the views of the drawings, referring to which:

A is a wheel felly, preferably of wood, and B is a rim preferably of aluminum or other metal, which surrounds the felly and is connected thereto through the medium of radial screws C, the heads of which are disposed at the inner side of the felly. The said rim B is provided with side, undercut flanges $a$ and with side concavities or depressions $b$, and its face $c$ is of concave form in cross-section and is channeled, as indicated by $d$, for purposes hereinafter set forth.

D D are the springs of the tire, which are preferably of thin steel and are spaced apart as clearly shown in Fig. 2.

E E are segmental strips of metal which have tongues $e$ disposed in the channel $d$ of the rim B to receive the ends of the screws C by which the segmental strips are held to the rim and felly, and F F are bumpers or shock resisters, preferably of wood, arranged on and corresponding in width and length to the strips E.

As will be readily understood by reference to Fig. 3, the ends of the springs D are interposed between the strips E and the face of the rim B, and the spring ends, the strips E and the bumpers or shock-resisters F are connected together through the medium of screws G, the heads of which are interposed between the spring ends and the face of the rim, and hence cannot work loose. It will also be observed by referring to Fig. 3 that the outer or bow portions of the springs are connected by a thin circumferential or tread strip of metal H, riveted or otherwise connected thereto, as indicated by $g$. The said strip H holds the springs D in their spaced relation and prevents rubbing of the springs together as well as working of the cover, hereinafter described, between the springs. By comparison of Figs. 2 and 3 it will further be observed that the springs are curved two ways at the tread. This is materially advantageous inasmuch as it tends to stiffen and strengthen the springs at that point.

It will be gathered from the foregoing that the plurality of springs D form what is virtually a resilient tube. This tube constitutes the chief feature of our invention since it serves the same purpose as the inflatable tube of a pneumatic tire, and yet is stronger and more durable and is not liable to be punctured or otherwise rendered unfit for use. It will also be gathered from the foregoing and we desire it distinctly understood that the resilient tube formed as shown and described may be used inside the well known clencher or any other type of tire to which it is adaptable.

As their name implies the bumpers or shock resisters F serve to prevent crushing of the springs D when an extraordinary weight is placed on the wheel or the same is subjected to severe shock.

I is the cover or shoe which is formed in one piece of some pliable or other suitable material. The said cover is provided with jaws $m$ adapted to catch under the flanges $a$ of the rim B. The cover is also provided in its edges, at intervals of its length, with notches $p$. These notches are for the passage of the screws J through the medium of which the stretching rings K are connected to the rim B. The stretching rings are so denominated because they serve when the screws J are turned into the rim B, to press the sides of the cover into the side depressions or concavities b of the rim and in that way stretch or draw the cover taut over the springs D. This stretching of the cover gives the tire the appearance of the conventional automobile tire and at the same time tightly seals the cover so that no water or dust or other substance can gain access to and deteriorate the springs.

It will be readily understood from the foregoing that when necessity demands the cover or shoe I may be quickly and easily removed and replaced with a new cover without impairing or affecting the other parts of the tire.

The modified cover $I^2$ of Fig. 4 is similar to the cover I, with the exception that its jaws $m^2$ are stiffened and strengthened by strips of metal $n$ and have outwardly extending flanges $m^4$ adapted to rest against the inner edges of the stretching rings K.

As before stated the construction herein shown and described constitutes the best practical embodiment of our invention of which we are aware, but it is obvious that in the future practice of the invention such changes or modifications may be made as do not depart from the spirit of our invention as claimed.

Having described our invention, what we claim and desire to secure by Letters-Patent, is:

1. In a tire, the combination of a rim, segmental clamping strips connected thereto, spaced metallic springs, of substantially circular form, having their ends interposed between the clamping strips and the rim, a circumferential or tread strip connecting the bow portions of the springs, segmental bumpers arranged in the inner portions of the metallic springs, and screws connecting the ends of the springs, the clamping strips, and the bumpers together.

2. In a tire, the combination of a rim, segmental clamping strips arranged against the periphery thereof, radial screws connecting said strips to said rim, spaced metallic springs, of substantially circular form, having their ends interposed between the clamping strips and the rim, a circumferential or tread strip connecting the bow portions of the springs, segmental bumpers arranged in the inner portions of the metallic springs, and screws extending through the ends of the springs and the segmental strips and into the segmental bumpers, in the order named, and having their heads interposed between the periphery of the rim and the ends of the springs, for the purpose set forth.

In testimony whereof we have hereunto set our hands in presence of two subscribing witnesses.

BYRON W. MEREDITH.
OSCAR WILDMAN.

Witnesses:
ROXANA L. BOND,
ANNA E. M. BOND.